United States Patent [19]
Phillips et al.

[11] 3,787,011
[45] Jan. 22, 1974

[54] PARACHUTE RELEASE

[75] Inventors: John J. Phillips, Rolling Hills; Thomas A. Clark, Santa Monica, both of Calif.

[73] Assignee: G & H Technology, Inc., Santa Monica, Calif.

[22] Filed: Apr. 10, 1972

[21] Appl. No.: 242,587

[52] U.S. Cl. .............................................. 244/150
[51] Int. Cl. ........................................... B64d 17/58
[58] Field of Search ............. 244/149, 150; 188/164

[56] References Cited
UNITED STATES PATENTS

| | | | |
|---|---|---|---|
| 3,436,037 | 4/1969 | Stanley | 244/149 |
| 2,869,810 | 1/1959 | Leonard | 244/150 |
| 2,821,269 | 1/1958 | Keil | 188/164 |
| 2,525,608 | 10/1950 | Kuntz | 244/150 |

FOREIGN PATENTS OR APPLICATIONS

| 1,178,079 | 12/1958 | France | 244/149 |
|---|---|---|---|

*Primary Examiner*—Duane A. Reger
*Assistant Examiner*—Charles E. Frankfort
*Attorney, Agent, or Firm*—Dan R. Sadler

[57] ABSTRACT

A parachute release is disclosed herein for automatically deploying a parachute without any assistance from the pilot. The release is effective to deploy the parachute within some predetermined short interval of time such as ½ to 2 seconds after the pilot has ejected from his aircraft and/or has separated from his seat, provided that he is below some preselected altitude such as 15,000 feet. In the event the pilot ejects at an altitude which is above this level, the release will not deploy the parachute until the pilot has free-fallen to that preselected level at which time the release will automatically deploy the parachute.

10 Claims, 6 Drawing Figures

PARACHUTE RELEASE

BACKGROUND

In the event of a catastrophic failure of an aircraft, it is customary for the pilot, crew, passengers, etc., to parachute from the aircraft. Under some circumstances, such as with a high-performance jet aircraft, a person may not be capable of manually actuating his parachute and/or he may not be capable of doing so fast enough or at the proper time to be of value. For example, if the aircraft is traveling at a high speed, at a high altitude, there is an explosion, etc., the person frequently passes out or at best is only semi-conscious prior to, during and/or following ejection. As a consequence, he will not be able to deploy his parachute. If he is at an extremely high altitude, he may not be capable of waiting to open the parachute until he has free-fallen to a lower, safe altitude. Even if he is conscious and fully alert, if he ejects from the aircraft at a very low altitude (i.e., a few hundred feet), he may not be able to wait until he is clear of the aircraft and then open his parachute fast enough for it to fully open before he strikes the grounds.

Although various types of automatic parachute releases have been provided heretofore, they have not been extremely satisfactory for various reasons. For example, when the aircraft is operating at an extremely low altitude such as on a runway or just a few hundred feet off of the ground, it is necessary for the parachute to open as rapidly as possible. However, it is essential that before the parachute begins to deploy, the pilot be fully separated from the aircraft and/or his seat, etc. If the parachute starts to deploy too soon, there is a high probability it will become fouled with the aircraft and/or its equipment and will fail to properly open. On the other hand, if there is any unnecessary delay following separation, there is a high probability the parachute will not have adequate time to fully open, even though it is not fouled. It has been found, for example, that when the pilot ejects at or near ground level, the parachute should be depoyled within ½ to 2 seconds following the separation of the person from his seat. Automatic releases provided heretofore have not been capable of reliably operating at these short time intervals within the necessary tolerances.

If the pilot ejects at a higher altitude, such as a few thousand feet above ground level, there is no particular necessity for the parachute to be deployed within such extremely short time intervals. In fact, it may be desirable to delay deploying the parachute for a short period of time, particularly when the aircraft has been operating at extremely high velocities. This will allow the pilot to slow to his terminal velocity whereby the impact which occurs upon the opening of the parachute will be greatly reduced. If the pilot ejects at an altitude where the air is too thin to breathe, for example 30,000 or 40,000 feet, and the parachute is quickly deployed, by the time he reaches an altitude where he can breathe (i.e., 10,000 or 15,000 feet) he will have been asphyxiated.

SUMMARY

The present invention provides means for overcoming the foregoing difficulties. More particularly, the present invention provides an automatic parachute release which will allow the parachute to delay opening until the pilot has separated from the aircraft and/or his seat but which will still do so fast enough to insure the parachute opening even though the pilot may eject at an extremely low altitude. Also, the release will be effective to prevent the parachute opening when the pilot is still in a rarified atmosphere. However, when the pilot has free-fallen to some safer elevation, such as 10,000 to 15,000 feet, the parachute will be automatically deployed.

DRAWINGS

DESCRIPTION

Figure 1A:
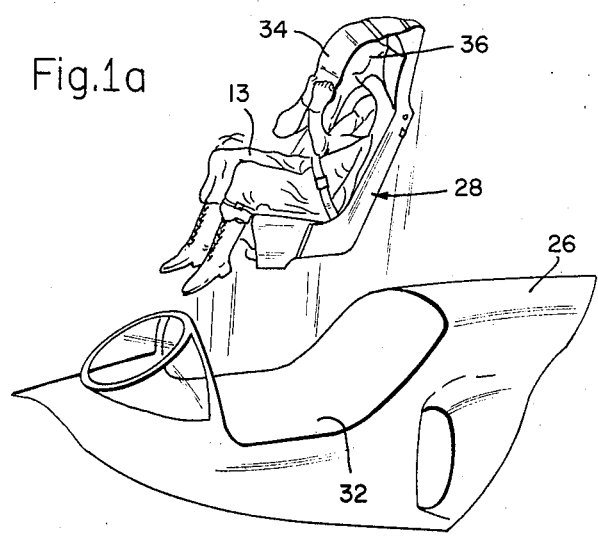
FIG. 1 is a time-related sequence of views of a person wearing a parachute equipped with an automatic release embodying the present invention wherein:
  a. the person is ejecting from an aircraft while he is secured in his seat,
  b. he is separating from the seat, and
  c. the deployment of his parachute is automatically initiated by the release.
Figure 1B:
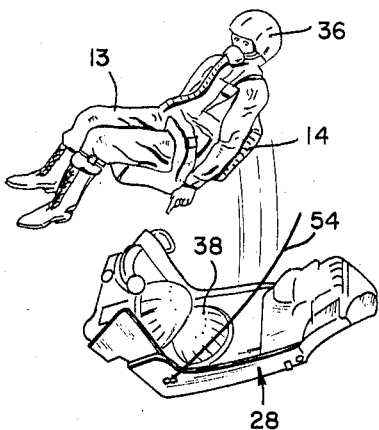
Figure 2:
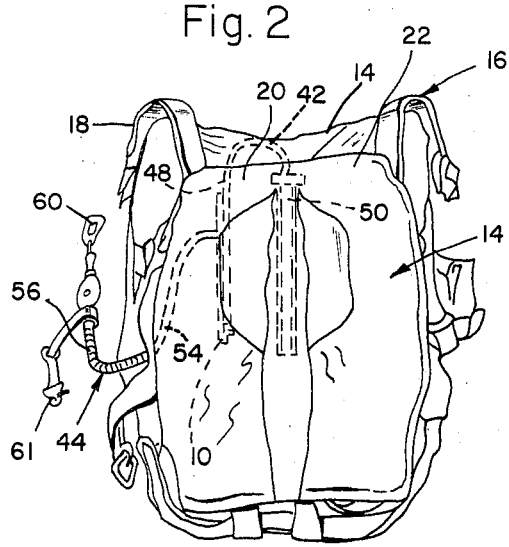
FIG. 2 is a rear view of a back-pack parachute equipped with the automatic release embodying one form of the present invention.
Figure 1C:
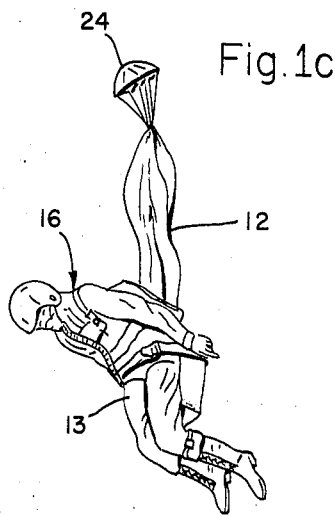

Referring to the drawings in more detail and particularly to FIGS. 1 and 2, the present invention is embodied in an automatic release 10 for use with a conventional parachute 12. Although the parachute 12 may be of any desired type, in the present instance it is of the so-called back-pack variety. A parachute 12 of this nature is normally packed within a container or pack 14 adapted to be worn on the back of a person such as the pilot 13 or any other person on board the aircraft.

The parachute pack 14 is secured to the person by a suitable harness 16. The present harness 16 includes one or more straps 18 that extend over and across the person's shoulders, chest, etc. The parachute risers, etc, are also secured onto this harness 16.

To deploy the parachute 12 a device such as a rip cord is pulled whereby one or more flaps 20-22 on the back of the pack 14 separate and open. When these two flaps 20-22 open, a small pilot parachute 24 is deployed. The pilot parachute 24 is effective to rapidly pull the entire main parachute 12 out whereby it is quickly opened.

In some aircraft such as a high-performance jet 26, the crew members such as the pilot 13 are explosively ejected from the aircraft. This is normally accomplished by ejecting the entire seat 28, etc., while the pilot 13 is still sitting in it.

In order to eject from the aircraft 26, the pilot 13 first jetisons the aircraft canopy enclosing the cockpit 32. Immediately following this the pilot 13 pulls a protective cover 34 over the top of his head 36 and down to his chest. After this has been done an eject button is activated whereby an explosive charge under the seat 28 is detonated.

The detonated charge then propels the seat 28, with the pilot 13 still in it, upwardly and away from the aircraft 26. As soon as the seat 28 has risen a sufficient distance to be above and clear of the aircraft 26, the pilot 13 is separated from the seat 28. This may be accomplished by tightening a "kicker strap" and/or by inflating a balloon or bladder 38 or some other mechanism.

Once the pilot 13 has separated from the seat 28, the parachute 12 may be deployed. In the present instance this is accomplished by means of the automatic release 10 contained in the parachute pack 14.

Figure 3:
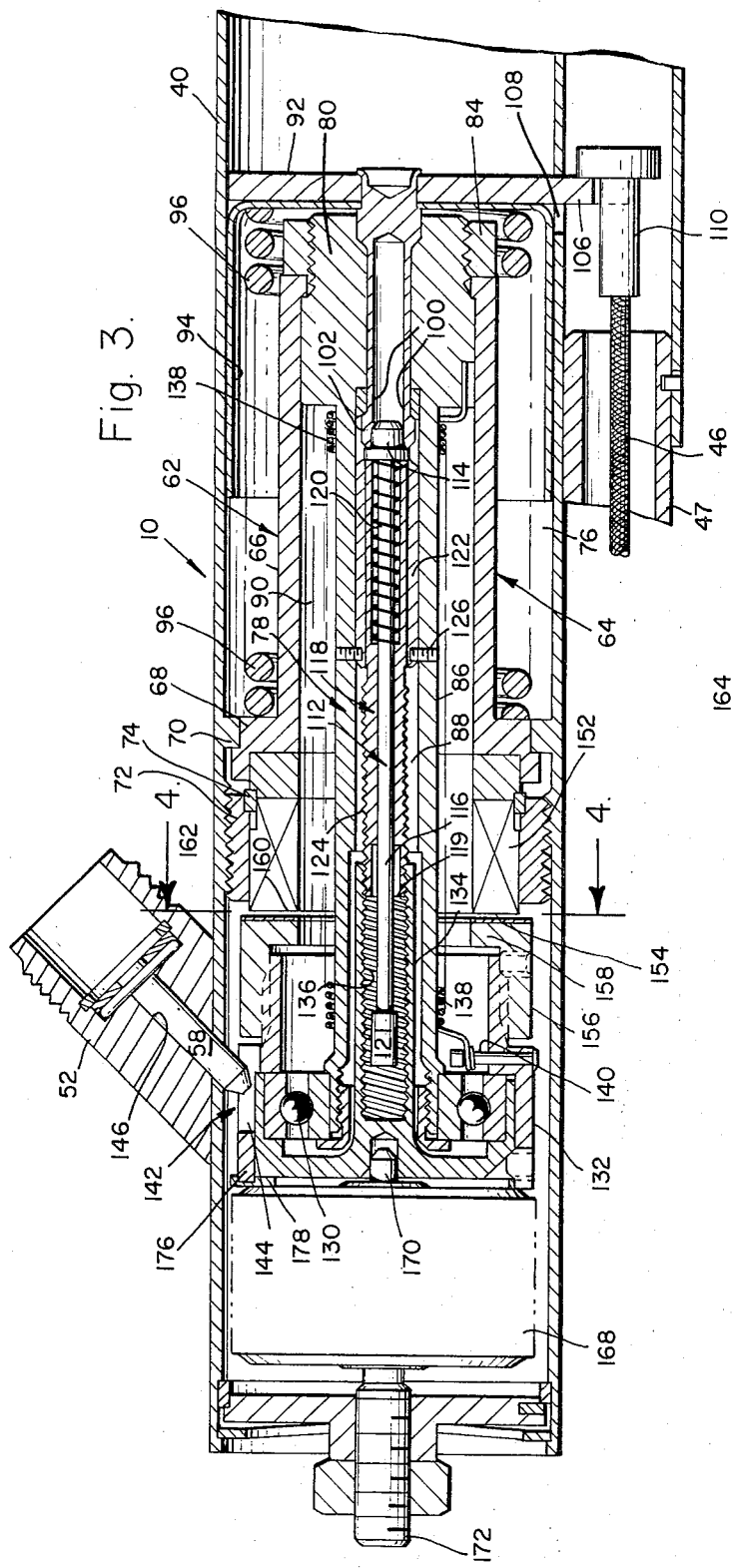
FIG. 3 is a longitudinal, corss-sectional view of a portion of the release.

The automatic release 10 is best illustrated by the cross-sectional view in FIG. 3. The release 10 is enclosed in a housing 40 that is adapted to fit onto and/or into the parachute pack 14. In this embodiment the housing 40 is an elongated, substantially cylindrical barrel. The housing 40 usually has a diameter on the order of 1 or 2 inches and a length on the order of 10 or 12 inches.

The release 10 includes two separate cables 42 and 44 which extend from the housing 40. The first cable 42 includes a core 46 that extends axially through a tubular guide 47 on the side of the housing 40 and into a cover or sheath 48. The sheath 48 forms an arc or loop that extends from the release 10 over to the two flaps 20-22 on the back of the pack 14.

The core 46 extends through the sheath 48 and is attached to the rip cord 50 that maintains the two flaps 20-22 together. When this core 46 is pulled axially through the sheath 48, the fastenings which secure the two flaps together are released whereby the two flaps 20-22 separate and thereby allow the parachute 12 to be deployed.

The second cable 44 includes a cover or sheath 56 that is attached to an arm 52 extending diagonally from the side of the housing 40. A core 54 is slidably disposed inside of the sheath 56. The inner end of this core 54 is connected to a pin 58 which is slidably disposed inside of the arm 52. This pin 58 controls the operation of the release 10.

The second end of the core 54 includes an attachment or fitting such as a snap fastener 60. The snap fastener 60 on the end of the core 54 and a similar fastener 61 on the end of the sheath 56 are adapted to be connected to some fixed reference. Normally the fixed reference is a coupling such as a ring, etc., on the seat 28 in which the person is sitting.

During normal conditions the sheath 56, the core 54, etc., are sufficiently flexible and there is enough slack, etc., to allow the person 13 to move around in the seat 28 without in any way affecting the release 10 and/or the parachute 12. However, if and when the person 13 separates from his seat 23, (i.e., without first disconnecting the cable 44 from the seat 28) the core 54 will be pulled through the sheath 56 and thereby actuate the release 10.

A fixed support structure 62 is disposed inside of the housing 40 and rigidly locked in position. In the present instance this structure 62 includes a first support member 64 having an elongated cylindrical extension or barrle 66. An enlarged head 68 on one end of the support member 64 projects radially outwardly. An annular groove recessed into the head 68 is adapted to snugly fit onto a radial flange or shoulder 70 on the inside of the housing 40.

A ring 72 is threaded into the housing 40 to force the clamp 74 against the head 68 and compress the head 68 against the flange 70. It can be seen this arrangement is effective to securely lock the entire support member 64 in a fixed, rigid position inside of the housing 40.

The exterior of the support member 64 has a diameter which is smaller than the inside diameter of the housing 40. This forms an elongated cylindrical chamber 76.

A core 78 is disposed inside of the support member 64. This core 78 includes an enlarged head 80 which snugly fits inside of the support member 64. The head 68 includes a reduced end that forms a radial shoulder and extends through the open end of the support member 64. A nut 84 tightened onto the reduced end of the core 78 compresses the radial shoulder against a mating radial shoulder on the end of the support member 64 whereby the core 78 is securely locked into a fixed position.

The core 78 includes a long, slender tubular portion or sleeve 86 which projects axially through the barrel 66 of the support member 64 and beyond the enlarged head 68. The interior of the core 78 is formed by a passage 88 that extends axially through the entire length of the core 78. The exterior of the sleeve 86 has a reduced diameter whereby an elongated chamber 90 is provided between the core 78 and the support member 64.

A cup or piston 94 is slidably disposed in the passage or chamber 76 extending axially through the housing 40. The cup or piston 94 is adapted to ride on the inside of the housing 40 and travel axially therethrough. A member such as a disc 92 is mounted upon the piston 94 and includes an arm 106 which projects through a slot 108 in the side of the housing 40.

A spring 96 is disposed in the chamber 76 on the outside of the support member 64. One end of the spring 96 engages the shoulder formed by the flange 70 and the enlarged end of the support member 64. The opposite end of the spring 96 fits inside of the cup 94 and forces it and the disc 92 axially through the inside of the housing 40.

The cup or piston 94 and the disc 92 are secured together by a collet 98. At least a portion of the collet 98 is hollow and slotted so as to form several resilient fingers 100. The fingers 100 extend axially through the end of the core 78 and into the passage 88.

The ends of the fingers 100 have enlargements 102 which fit against a collet bushing 104. As long as these enlarged ends 102 are biased radially outwardly and held against the bushing 104, they cannot pass through bushing 104 and the passage through the end of the core 78. As a consequence, the piston 94 will be held in position and the spring 96 will be maintained fully compressed.

Preferably the mating surfaces on the collet bushing 104 and on the enlarged ends of the fingers 100 are tapered. With such a tapering of the surfaces, the axial force from the spring 96 will create a radial force on the ends of the fingers 100. As a consequence, there will be a tendency to compress the fingers 100 radially inwardly whereby they will pass through the end of the core 78 and release the piston 94.

The arm 106 on the disc 92 extends laterally through the slot 108 in the side of the housing 40 and into the tubular guide 47. The end of arm 106 is forked to fit around and be attached to a fitting 110 on the end of the rip cord or the core 46.

When the release 10 is in the armed or retracted position, (i.e., the position shown in FIG. 3) the rip cord maintains the two flaps 20-22 connected together and the parachute 12 sealed inside. However, when the piston 94 is released, the heavy spring 96 forces the piston 94 to travel axially through the passage 76 in the housing 40 at a high rate of speed. The arm 106 which is attached to the fitting 110 then pulls the rip cord sufficiently fast and far to release the closure flaps 20–22 on the back-pack 14 whereby the parachute 12 is deployed.

A retainer pin 112 is disposed inside the barrel 86 of the core 78. The retainer pin 112 has an enlarged head 114 that fits inside of the fingers 100. The head 114 spreads the fingers 100 radially outwardly and maintains the enlarged ends 102 against the collet bushing 104. This is effective to prevent the enlarged ends 102 moving inwardly and passing through the end of the core 78. As a consequence, the piston 94 is maintained locked in position against the force of the spring 96.

As stated above the mating surfaces on the enlarged ends 104 of the fingers 100 and on the collet bushing 104 are conically tapered. As a consequence, the axially directed force from the large spring 96 is effective to create a radially inwardly directed force on the enlarged ends 102. This radial force tends to urge the enlarged ends 102 inwardly whereby they are free to move axially through the bushing 104 and the head 80 of the core member 78. In addition, if desired the fingers 100 may naturally spring radially inwardly.

The magnitude of the radial force is depenent upon several factors such as the conical angle of the sloping surfaces, the force of the spring, etc. On the one hand, the radially inwardly directed force should be large enough to insure the fingers moving rapidly inwardly and through the end of the core.

However, on the other hand the magnitude of the force should not be large enough to materially interfere with an easy and rapid withdrawal of the head 114 of the pin 112.

The shank 116 of the retainer pin 112 is slidably disposed inside of a drive screw 118. A coil spring 120 is disposed around the shank 116 of the pin 112 and inside of the drive screw 118. This spring 120 biases the enlarged head 114 of the pin 112 into the fingers 110. This is true even though the drive screw 118 may move a substantial distance away from the head 114 of the pin 112.

The drive screw 118 includes an enlarged, cylindrical guide portion 122 which slidably fits in the passage 88 through the core member 78. The drive screw 118 includes a second portion having external threads 124. One or more pins 126 project inwardly from the core into corresponding slots on the enlarged guide portion 122. This arrangement effectively prevents the screw 118 from rotating within the core but allows the drive screw 118 to slide axially of the core member 78.

As the drive screw 118 begins its travel axially through core member 78, the spring 120 expands and insures the enlarged head 114 being firmly retained in its position inside of the enlarged ends 102. However, after the drive screw 118 has traveled a preselected distance, the end 119 of the screw 118 engages the enlarged head 121 on the end of the retained pin 112. Any further axial movement of the drive screw 118 will then carry the retained pin 112 with it whereby the head 114 will be extracted from the enlarged ends 102 of the fingers 100.

An armature 128 is rotatably disposed inside of the housing 40. In the present instance the armature 128 is supported by a roller bearing 130. The inner race of the bearing 130 is secured onto the end of the core member 78 by a threaded clamp. The outer race of the bearing 130 is attached to the inside of a cylindrical rim 132 on the armature 128.

The armature 128 includes a central hub and a radial section or web which extends radially along the side of the ball bearing 130 between the hub and the rim 122. The hub includes an axial extension 134 which projects from the center thereof. The extension 134 projects into the passage 88 through the core member 78. The axial extension 134 has internal threads 136 which engage the threads 124 on the outside of the drive screw 118.

A torsional spring 138 is disposed concentrically around the barrel or sleeve 86 of the core member 78. One end of the spring 138 is anchored on the core member 78 and the other end is attached to the armature 128 by a pin 140.

This spring 138 applies a torque to the armature 128 and causes it to rotate about the drive screw 118. During this rotation the threads 136 cause the drive screw to be pulled into the axial extension 134.

As the drive screw 118 is pulled into the extension 134 it moves away from the head 114. However, the spring 120 continues to bias the head 114 into the fingers 100. When the end 119 strikes the head 121, it will move the pin 112 and pull the head 114 out of the fingers 100 whereby they can pass through the passage in the end of the core member 78.

Detent means 142 are provided for retaining the armature 128 locked in a fixed position. In the present instance the detent means 142 includes a groove or recess 144 on the exterior of the rim 132. The recess 144 is positioned so as to be aligned with the diagonal passage 146 through the arm 52 when the armature 128 is in the armed position shown.

As a consequence, under these circumstances, when the pin 58 is extended from the passage 146 it will project into the recess 144 and retain the armature 128 locked in position and prevent its rotating. However, if the pin 58 is retracted into the passage 146 it will be withdrawn from the recess 144 and the armature 128 will be released.

As soon as the armature 128 is released, the torque from the torsional spring 138 causes the armature 128 and the axial extension 134 thereon to rotate. As the internal threads 136 on the extension 134 revolve upon the external threads 124, the drive screw 118 is pulled into the axial extension 134 whereby the drive screw 118 is pulled toward and into the axial extension 134.

The rotation of the armature 128 and the pulling of the drive screw 118 continues until after the head 114 of the drive screw 118 is extracted from the enlarged ends 102 of the fingers 100. As soon as the head 114 is extracted the ends 102 of the fingers 100 are forced radially inwardly beyond the collet bushing 104.

When the fingers 100 are retracted they pass through the collet bushing 104 and the passage through the end of the core member 78. This in turn releases the piston 94 whereby the spring 96 is free to drive the piston 94 axially through housing 40 and pull on the core 46 unitl the rip cord releases the two flaps 20 and 22 and allows the parachute 12 to be deployed.

The time delay between the pulling of the pin 148 from the recess 144 and the extraction of the enlarged head 114 from the ends 102 of the fingers 100 determines the time delay for deploying the parachute 12.

The magnitude of this delay is determined by several factors, i.e., the torsion of the spring 138, the pitch of the threads 124 and 136 and the length of the travel between the end 119 of the drive screw 118 and the enlarged head 121 on the retainer pin 112.

By varying one or more of the foregoing factors the magnitude of the time delay may be preset to the desired amount. However, it has been found that if the pilot 13 is apt to eject at a low level (for example while the aricraft is traveling on the runway) the time delay must be just long enough to allow the pilot 13 to clear the aircraft but short enough to insure the parachute being successfully deployed before the pilot 13 hits the ground. This is usually a time span of from abut ½ to 2 seconds.

It has been found as a practical matter that with the usual production tolerances it has been extremely difficult if not impossible to provide a time delay within the foregoing limitations. Therefore, if the release is to be used at low altitudes, such as at ground level, it is desirable to provide some means for more precisely regulating or controlling the magnitude of the delay.

Although this may be accomplished in any desired manner, in the present instance means are provided for adjustably regulating the rate at which the armature 128 rotates. Again, there are numerous ways in which this may be accomplished. However, by way of example, in the present instance an eddy current brake 150 is provided.

The present eddy current brake 150 includes an annular or ring magnet 152. The magnet 152 is retained in a fixed position inside of the housing 40. In the present instance it is secured inside of the retained ring 72. The magnet 152 forms an annular pole face 154 in a plane normal to the axis of the housing 40 and adjacent the armature 128.

An extension 156 is threadably mounted upon the armature 128 so as to rotate therewith. Te extension 156 includes a radial flange 158 disposed adjacent the pole face 154 on the magnet 152. This arrangement forms a thin, annular air gap 160 between the flange 158 and the pole face 154.

Figure 4:
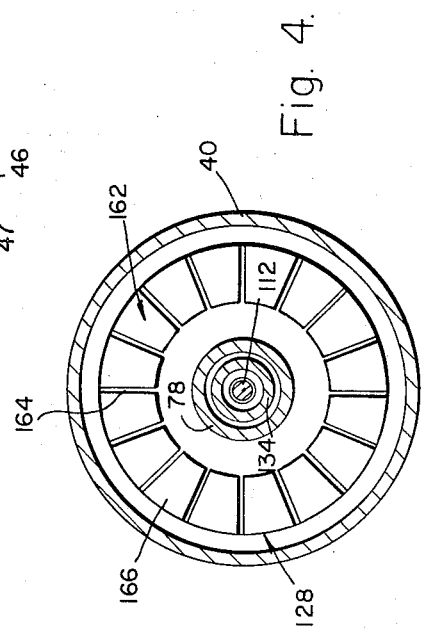
FIG. 4 is a transverse, cross-sectional view taken substantially along the plane of line 4—4 of FIG. 3.

In order to improve the effectiveness of the eddy current brake 150, the flange 158 should be highly electrically conductive. If the flange 158 is not made from a highly conductive material, a ring 162 of highly conductive material may be bonded to the flange 158. Moreover, as best seen in FIG. 4, the ring 162 may have several radial cuts 164 to form a large number of electrically separated segments 166.

When the armature 128 rotates or spins, the conductive ring 162 moves through the magnetic flux field from the pole face 154. This, in turn, creates a torsional drag on the armature 128 and reduces the rate at which it spins.

The amount of the torsional drag and the speed of rotation are a function of the intensity of the flux field entering the conductive ring 162. The extension 156 is threadably mounted upon the armature 128. Accordingly, by rotating the extension 156 relative to the armature 128, the extension 156 will move axially toward or away from the pole face 154 on the magnet 152. By adjusting the length of the air gap 160, the magnitude of the flux field extending within the ring 162 is varied. This, in turn, varies the amount of drag or braking imposed upon the armature 128 whereby the speed at which it runs is controlled.

If the pilot 13 is apt to eject at high altitudes, it may be desirable to delay deploying the parachute 12. For example, if the pilot 13 ejects at an altitude of 30,000 or 40,000 feet or higher and immediately deploys his parachute, there is a very high probability he will be asphixiated before he reaches an altitude where the air is dense enough to insure adequate respiration.

It is, therefore, desirable for the release 10 to include some means to insure a delayed opening while the pilot 13 freely falls to an altitude where proper respiration is assured.

In the present instance this is accomplished by providing an altitude-sensitive device such as an aneroid capsule or bellows 168. The bellows 168 is disposed inside the housing 40. One end of the bellows 168 is supported by a small pin 170 that fits into the armature 128. The other end of the bellows 168 is supported by an axially adjustable screw 172.

Some form of detent means 174 is provided which is actuated by the bellows 168. This detent means 174 is effective to foreclose the operation of the release 10 above a preselected altitude but to allow operation below the altitude.

In the present instance the detent means 174 includes a small arm 176 on the armature 128 and a small stop 178 on the bellows 168. When the barometric pressure is too low for proper breathing (for example above 15,000 feet altitude), the bellows 168 expands axially enough to place the stop 178 in the path of arm 176 whereby the armature 128 cannot spin. When the atmospheric pressure becomes high enough to breathe, the bellows 168 is compressed axially and the stop 178 is moved out of the path of the arm 174. The altitude at which this occurs is adjusted by turning the screw 172.

In order to utilize the automatic release 10, the various springs, etc., are normally compressed and the fitting 110 is attached to the arm 106. The arming pin 148 is also positioned in the recess 144 and prevents armature 128 from turning. The release is installed in the pack 14.

When the pilot 13 enters the aircraft and is in his seat 28, the snap 60 on the end of the arming cable 44 is attached to the fitting on the seat 28. This will normally not affect or impair the ability of the pilot 13 to perform his various duties.

In the event that it is necessary to eject from the aircraft, the pilot 13 goes through the normal ejection procedures. More particularly, he ejects the aircraft canopy, pulls a protective cover 34 over his face and down to his chest, and then activates the ejection mechanism. When this occurs the seat 28 with the pilot 13 in it is ejected from the aircraft 26.

As long as the pilot 13 remains in the seat 28, the release 10 is not in any way affected. However, as soon as the seat 28 is sufficiently clear of the aircraft 26, the pilot 13 is separated from the seat 28 by inflating the bladder 38 or any other conventional device. As the pilot 13 separates from the seat 28, the core 54 of the cable 44 remains with the seat 28 whereas the release 10 and the sheath 56 remains with the pilot. During this separation the arming pin 58 is pulled through the sheath 56.

As soon as the arming pin 58 is removed, the armature 128 is free to spin under the influence of the torsional spring 138. As this spinning occurs and progresses, eddy currents are created in the ring 162. The rate at which these eddy currents are generated determines how fast the armature 128 will spin. This, in turn, may be adjusted by rotating the extension 156 on the rim 132 so as to change the size of the air gap 160.

During the spinning motion of the armature 128, the drive screw 118 is pulled into the armature. When a sufficient number of turns have occurred, the end 119 of the drive screw 118 hits the enlarged head 121 of the pin 112. When this occurs the pin 112 is moved axially and the head 114 is removed from the fingers. This then will allow the fingers 114 to retract radially inwardly and pass through the opening in the end of the support. As soon as this happens the piston 94 is free to travel. The spring 96 will then drive the piston 94 and arm 106 axially through the housing 40 until the rip cord is pulled and the parachute released.

It can be seen by adjusting the position of the extension 156 it is possible to vary the magnitude of the eddy currents, breaking effect, etc. Thus, the amount of time required between the withdrawal of the arming pin and the pulling of the rip cord can be adjusted. Normally in the typical situation this time will be adjusted to about one second. This is adequate to insure the pilot 13 being separated from his seat, etc. However, within a short period such as this, the parachute can be deployed and fully opened so as to become effective before the pilot has fallen to ground level.

In the event the aircraft is operating at a high altitude when the ejection occurs, the bellow 168 is axially expanded. When the arming pin 56 is withdrawn, as soon as the armature 128 starts to spin the arm 176 will strike the stop 178. The armature 128 will thus be prevented from rotating until the pilot has freely fallen to a level where the bellows is compressed enough to move the stop 178 out of the path of the arm 176.

We Claim:

1. A release for pulling a rip cord and deploying the canopy of a parachute when the person wearing the parachute ejects from an aircraft and separates from his seat, said release including the combination of
   actuation means for being coupled to the rip cord for actuating the rip cord and deploying the canopy of the parachute,
   separation means responsive to the separation of the person from his seat, said separation means being coupled to said actuation means for actuating the rip cord when said person separates from his seat,
   retaining means coupled to the actuation means and effective to prevent operation of the actuation means for a predetermined interval of time after actuation of the separation means, and
   an eddy current brake in said retaining means for controlling the rate of operation of said retaining means for thereby adjusting said interval of time.

2. The release of claim 1 including
   a drive screw coupled to the separation means and the actuation means, said drive screw being effective to release the actuation means after the drive screw has traveled a predetermined distance,
   an armature coupled to the drive screw, said armature being effective to rotate and move the drive screw through said predetermined distance, and
   said eddy current brake being coupled to the armature and effective to control the speed at which the armature rotates.

3. The release of claim 2 including
   second retaining means responsive to the altitude of the release and effective to prevent operation thereof above a predetermined altitude.

4. A parachute release for pulling the rip cord and deploying the canopy when the person ejects from an aircraft and separates from his seat, said parachute release including the combination of
   a housing adapted to be disposed inside of the parachute pack,
   an armature inside of said housing,
   a drive screw coupled to said armature and adapted to be coupled to the rip cord for actuating the rip cord, said drive screw being coupled to said armature whereby a predetermined number of rotations of said armature will cause said drive screw to actuate said rip cord and thereby release said parachute,
   latch means coupled to the armature for preventing said armature rotating,
   release means coupled to the latch means and adapted to be attached to said seat for releasing the latch means when the person separates from the seat,
   a spring inside said housing attached to the armature for rotatably driving the armature,
   an eddy current brake on said armature for applying a predetermined drag to the armature for limiting the rate at which the armature rotates, and
   means for adjusting said brake to vary the amount of drag on said armature.

5. The parachute release of claim 4 including
   second latch means coupled to the armature for preventing said armature rotating, and
   an aneroid bellows coupled to said second latch means for releasing said second latch means when the altitude of the release is less than a predetermined amount.

6. A parachute release for pulling the rip cord and deploying the canopy when a person ejects from an aircraft and separates from his seat, said parachute release including the combination of
   a housing adapted to be disposed in the parachute pack,
   a spring loaded drive in said housing adapted to be attached to said rip cord for pulling it,
   a plurality of resilient fingers having a lock position for releasably engaging said drive for restraining it against movement,
   a movable keeper effective to move into a first position wherein it engages said fingers and retains them in said lock position and into a second position wherein it is separated from said fingers whereby said fingers are free to disengage and release said drive means,
   a spring driven motor,
   a lost motion screw drive coupling said motor to said keeper for moving said keeper from said first position to said second position after said motor has rotated a predetermined number of turns,
   first and second detents coupled to said motor for preventing operation of said motor,
   first means coupled to said first detent for releasing said detent as said person separates from said seat, and
   second means coupled to said second detent means for releasing said second detent below a predetermined altitude.

7. The parachute release of claim 6 wherein said motor includes
an armature that rotates about the axis thereof, and
a magnet disposed adjacent said armature and separated therefrom by an air gap so as to create eddy currents therein when said armature rotates.

8. The parachute release of claim 7 wherein said motor is adjustable so as to vary the width of said air gap.

9. The parachute release of claim 6 wherein said second detent includes an aneroid bellows.

10. A parachute release for pulling the rip cord and deploying the canopy when the person ejects from an aircraft and separates from his seat, said parachute release including the combination of
a housing adapted to be disposed inside of the parachute pack,
a spring driven motor having an armature inside of said housing,
an eddy current brake on said armature for applying a predetermined drag to the armature for limiting the rate at which the armature rotates,
a drive screw coupled to said armature and adapted to be coupled to the rip cord for actuating the rip cord,
a drive screw coupled to said armature whereby a predetermined number of rotations of said armature will cause said drive screw to move a predetermined distance,
first and second latch means coupled to the armature for preventing said armature rotating,
release means coupled to said first latch and adapted to be attached to said seat for releasing said first latch means when the person separates from the seat,
an aneroid barometric bellows coupled to said second latch for releasing said second latch below a predetermined altitude,
a detent for restraining said drive to prevent the release thereof and for releasing said drive to pull said rip cord, and
a keeper coupled to said detent and said drive screw to actuate said keeper when the drive screw travels said distance.

* * * * *